US012597330B2

(12) United States Patent
Kincade

(10) Patent No.: US 12,597,330 B2
(45) Date of Patent: Apr. 7, 2026

(54) EAR BUD INTEGRATION WITH PROPERTY MONITORING

(71) Applicant: Alarm.com Incorporated, Tysons, VA (US)

(72) Inventor: Kameron Kincade, Highlands Ranch, CO (US)

(73) Assignee: Alarm.com Incorporated, Tysons, VA (US)

( * ) Notice: Subject to any disclaimer, the term of this patent is extended or adjusted under 35 U.S.C. 154(b) by 337 days.

(21) Appl. No.: 18/112,833

(22) Filed: Feb. 22, 2023

(65) Prior Publication Data

US 2023/0267815 A1 Aug. 24, 2023

Related U.S. Application Data

(60) Provisional application No. 63/313,569, filed on Feb. 24, 2022.

(51) Int. Cl.

| | |
|---|---|
| ***G08B 19/00*** | (2006.01) |
| ***G08B 21/04*** | (2006.01) |
| ***H04R 1/00*** | (2006.01) |
| ***H04R 29/00*** | (2006.01) |
| *H04R 1/10* | (2006.01) |
| *H04R 5/033* | (2006.01) |

(52) U.S. Cl.

CPC ........... *G08B 19/00* (2013.01); *H04R 29/001* (2013.01); *G08B 21/0453* (2013.01); *H04R 1/1016* (2013.01); *H04R 1/1041* (2013.01); *H04R 5/033* (2013.01); *H04R 2460/01* (2013.01); *H04R 2460/07* (2013.01)

(58) Field of Classification Search

CPC .. G08B 19/00; G08B 21/0453; H04R 29/001; H04R 1/1041; H04R 5/033; H04R 2460/01; H04R 2460/07; H04R 1/1016

USPC ............... 381/58, 56, 122, 91; 704/273, 274

See application file for complete search history.

(56) References Cited

U.S. PATENT DOCUMENTS

| | | | | |
|---|---|---|---|---|
| 2004/0257233 A1* | 12/2004 | Proebsting | ............. | G08B 23/00 340/539.1 |
| 2017/0347180 A1* | 11/2017 | Petrank | ................... | G06F 3/165 |
| 2019/0272725 A1* | 9/2019 | Viklund | ................. | G16H 20/10 |
| 2020/0265824 A1* | 8/2020 | Kremer | ............ | G10K 11/17885 |

* cited by examiner

*Primary Examiner* — Con P Tran

(74) *Attorney, Agent, or Firm* — Fish & Richardson P.C.

(57) ABSTRACT

Methods, systems, and apparatus, including computer programs encoded on computer-storage media, for earbud integration with property monitoring. In some implementations, data indicating sleep buds are in use by a user is received. Sensor data indicating an event at the property where the user is located is received. Alert preferences are obtained. A sleep bud alert is generated for the user based on the alert preferences, the event, and the data. The sleep bud alert is transmitted.

20 Claims, 5 Drawing Sheets

EAR BUD INTEGRATION WITH PROPERTY MONITORING

CROSS-REFERENCE TO RELATED APPLICATION

This application claims the benefit of U.S. Provisional Application No. 63/313,569, filed Feb. 24, 2022, and titled "Ear Bud Integration with Property Monitoring," which is incorporated by reference.

TECHNICAL FIELD

The present specification relates to monitoring and security systems.

BACKGROUND

Various security sensors can be used for home monitoring. Home monitoring systems can generate alerts based on sensor output.

SUMMARY

In some implementations, earbuds are integrated with a property monitoring system such as a home monitoring system or home security system. The earbuds can be integrated with the property monitoring system as an output device for notifications generated by the monitoring system when certain conditions are met, such as: when only one of multiple occupants are to be notified and an earbud notification is preferred so as to not disturb the other occupants; when an occupant wearing the earbuds needs to be waken as the occupant is not available to receive visual notifications and the earbuds may prevent the occupant from hearing other audible notifications; or when an alert audible to multiple persons could present a safety concern to the occupants.

The property monitoring system can determine a state of the property and detect events occurring at the property. The monitoring system can determine whether the conditions for generating and transmitting an earbud notification are met. The monitoring system can make this determination based on a particular state of the property, a type of event detected at the property, or both. If the conditions are met, the monitoring system can then generate an earbud notification and transmit the notification to the set of earbuds. The notification can be transmitted wirelessly or by using a combination of wired and wireless methods. Relatedly, the notification can be transmitted directly to the set of earbuds or indirectly through a computing device connected to the set of earbuds, such as a smart phone of the occupant. After receiving the notification, the set of earbuds can output the notification to the occupant using the earbud's speakers.

In some implementations, the set of earbuds are a set of sleep buds designed to assist an occupant of the property with falling and staying asleep. The sleep buds, for example, can play soothing noises or tracks on repeat or shuffle, eliminate noise through passive or active noise cancellation, or both. The sleep buds can include a transceiver, such as a wireless network adapter or Bluetooth transceiver, to allow the sleep buds to communicate with local, remote, or intermediate computing devices such as a smart phone of the occupant or with a control unit of the property monitoring system.

These communications can be alarms represented by particular noises that are played through the speakers to wake the occupant wearing the sleep buds. The communications can also be messages, such as pre-recorded or computer-generated speech, one or more words, or pre-recorded audio that are played through the sleepbud's speakers. Each of the alarms and messages are generated and sent by the monitoring system. As an example, a notification generated by the monitoring system and transmitted to the earbuds can include an alarm or an indication of an alarm pre-stored on a smart phone of the occupant. Additionally or alternatively, the notification can include a message. In response to receiving this notification, the sleep buds can play the alarm to wake a sleeping occupant wearing the sleep buds and, after playing the alarm for a set amount of time, play the message to communicate information to the occupant.

The disclosed techniques can be used to realize numerous advantages. For example, the disclosed techniques can be used to improve the level of security and safety that home security systems provide. For example, with the increasing popularity of earbuds, particularly sleep buds, comes increased safety risks. Earbuds can often impair the hearing of those wearing them, reducing the level of noise entering the wearer's ear canals or preventing certain sounds through noise-cancellation. By integrating earbuds with the proposed property monitoring system, the monitoring system can greatly improve the safety of occupants wearing the earbuds by providing them notifications that they otherwise might not receive due to the earbuds impairing the hearing of the occupants, the occupants being asleep, or a combination of the two. For example, if the monitoring system determines that there is a break-in at the property or a fire at the property, the monitoring system can generate and transmit earbud notifications to the occupants to quickly wake them and notify them of the situation.

Various other benefits can be achieved as a result of integrating the earbuds into the property monitoring system. For example, when a break-in at the property is detected, the monitoring system can determine that an earbud type notification should be generated and sent to the occupants. This earbud type notification can be generated and sent in addition to, or in lieu of, a notification to an occupant's smartphone. The monitoring system can identify or establish a wireless connection with an occupant's earbud (or sleepbud) and leverage that connection to send notifications discreetly to the occupant without alerting other occupants at the property. In some cases, after detecting a break-in, the monitoring system can determine that a smartphone type notification should not be sent but that a discreet earbud notification is preferred to audibly notify the occupants of the break-in without alerting the criminal to the occupant's location or presence.

Accordingly, the disclosed monitoring system can further improve security systems. Similarly, the monitoring system can determine that one occupant should be notified of a particular event and that another should not. By providing a notification to an earbud that is worn by a particular occupant, the monitoring system can notify the particular occupant without disturbing the other occupant. Accordingly, the monitoring system can intelligently provide notifications in a manner that improves user convenience and reduces frustration introduced by other notifications or alarms. The earbud notifications generated by the monitoring system can, themselves, provide particular advantages. For example, the monitoring system can provide notifications that combine an alarm with a message to improve the likelihood of the occupant receiving and comprehending the message. In providing these types of notifications, the monitoring system can improve notification efficiency and also improve user safety by improving the likelihood that notifications are received and understood.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
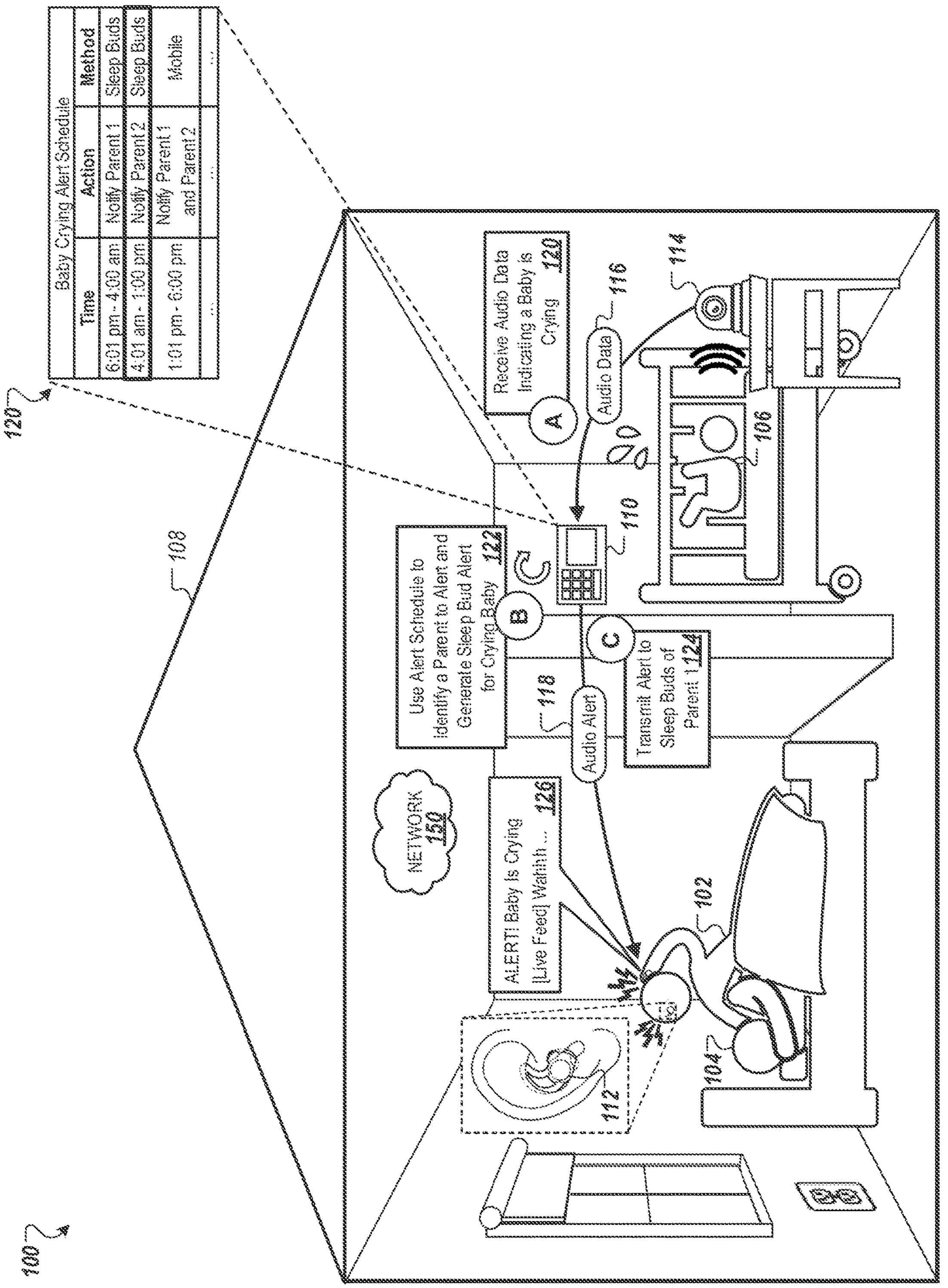
FIG. 1 is a diagram showing an example of a property monitoring system integrated with earbuds.

FIG. 1 is a diagram showing an example of a property monitoring system 100 integrated with earbuds 112. The earbuds 112 can be a set of sleep buds that support a sleep cycle of an occupant of a property 108. For example, the occupant can wear the sleep buds to assist them with falling and staying asleep. Although referred herein as earbuds (or sleepbuds), in some implementations, the earbuds 112 include other types of mobile audio devices, such as headphones, earphones, headsets, earring aids, canal phones, or other related personal audio devices for outputting audio to a user. The property monitoring system 100 can monitor the property 108 and include a control unit 110 and one or more connected devices that communicate with the control unit 110 over a network 150. The connected devices can include the earbuds 112 as well as other electronic devices, such as a smart baby monitor 114, mobile devices of occupants of the property 108 where the monitoring system 100 is installed, or the like.

The control unit 110 can include one or more computing devices. The control unit 110 can be programmed to manage notifications for the property 108. In managing notifications, the control unit 110 can determine when notifications should be generated (e.g., based on information obtained from the connected devices) and the types of notifications that should be generated. A type of notification can indicate one or more particular outputs devices for the corresponding notification, a format for the notification such as a particular notification template for the control unit 110 to use in generating the notification, or content of the notification such as a particular alarm for a set amount of time or a message for the occupants 102 and 104. The control unit 110 can use information received or obtained from the connected devices to make these determinations. The control unit 110 can communicate with the connected devices of the property 108 wirelessly and/or through wired connections.

In some implementations, the control unit 110 is an output device. For example, the control unit 110 can include one or more speakers that are used to audibly present notifications to the occupants 102 and 104. In more detail, if a security system of the property 108 is armed and the control unit 110 receives sensor data from a magnetic door sensor indicating that a front door of the property 108 has been opened, the control unit 110 can use the speakers to output an alert (e.g., "You have ten seconds to enter security code until police are called!") or an alarm in hopes of scaring off any intruders.

In some implementations, the control unit 110 can communicate with an external computing system. For example, the control unit 110 can communicate with a cloud-computing server over the network 150. The cloud-computing server can be used to, for example, store information, such as sensor data and other information obtained by the control unit 110 from the connected devices, data objects indicating notification (or alert) settings or preferences for the property 108 and/or the occupant 102 and 104, or analysis results generated by the control unit 110 using information obtained from the connected devices. The analysis results can include behavior patterns for each of the occupants 102 and 104, such as sleep schedules for each of the occupants 102 and 104, work schedules for each of the occupants 102 and 104, typical bed time for each of the occupants 102 and 104 during weekdays and weekends, typical wake time for each of the occupants 102 and 104 during weekdays and weekends, or the like. The control unit 110 can also use the external computing system for other tasks, such as machine learning tasks.

For example, the control unit 110 can obtain, from a cloud-computing system, information indicating notification preferences collected from other monitoring systems of other properties and use this information to generate notification preferences for the property 108 and/or the occupants 102 and 104. The control unit 110 can additionally or alternatively use an external computing system to provide processing resources for training one or more machine learning models, such as one or more k-means clustering models, neural networks, deep learning neural networks, or the like. As will be discussed in more detail below, the control unit 110 can use a cloud-computing system to train the one or more machine learning models to, for example, identify sets of conditions that should trigger a particular type of notification such as a notification to be provided through the earbuds 112.

The network 150 can include public and/or private networks and can include the Internet. The network 150 can also or alternatively include a local network for the property 108 that all or a subset of the connected devices communicate with the control unit 110 through. The network 150 can also or alternatively include a cellular network.

As discussed above, the connected devices can include the earbuds 112, mobile devices of the occupants 102 and 104, and the smart baby monitor 114. These devices can directly or indirectly transmit information to the control unit 110 continually (e.g., periodically) or in response to particular events. For example, a mobile device of the occupant 102 can transmit information to the control unit 110 indicating that the earbuds 112 have been removed from their charging case or have been wirelessly connected to the mobile device (e.g., Bluetooth connection) in response to the mobile device detecting the removal of the earbuds 112 from their charging chase or the wireless connection to the earbuds 112. As another example, the control unit 110 can obtain information from at least some of the connected devices by transmitting a request for information to those devices. The control unit 110 can transmit requests continually (e.g., periodically such as every 5 minutes, every hour, every day, etc.) or in response to detection of a particular event.

Other connected devices can include other sensing devices. For example, the other connected devices can include smoke detectors whose output indicates whether smoke is detected in the property 108, carbon monoxide detectors whose output indicates detection of a dangerous level of carbon monoxide in the property 108, smart energy plugs whose outputs indicates an amount of power being drawn by a particular device or set of devices of the property 108, cameras whose output includes image data from inside the property 108 or the area surrounding the property 108, microphones whose output includes audio data from inside the property 108 or the area surrounding the property 108, magnetic door and window sensors whose output indicates whether a door or window of the property 108 has been opened, or motion detectors whose output indicates the detection of motion in the property 108 or in an area surrounding the property 108.

The control unit 110 can receive or obtain information from the connected devices, including sensor data, and use the information to detect conditions of the property 108. For example, the control unit 110 can continually obtain sensor data and other information from the connected devices to detect events occurring at the property and/or a current state of the property. Based on the conditions detected, the control unit 110 can determine that a notification should be generated and provided to one or more connected devices to notify one or more of the occupants 102 and 104 of the property 108. For example, if the detected conditions indicate that the occupant 102 should be notified and that the occupants 102 is currently asleep, the control unit 110 can generate a notification that includes an alarm and provide the notification to the earbuds 112 worn by the occupant 102 to wake him. The type of notification generated by the control unit 110 can depend on the particular conditions detected.

In determining what condition or set of conditions should trigger generation of a notification or a particular type of notification (or alert), the control unit 110 can refer to a data object that associates different conditions or sets of conditions with one or more notifications and/or alerts. The data object can be a schedule for the property 108 or the occupants 102 and 104, a set of notification preferences for the property 108 or the occupants 102 and 104, or notification settings for the current state of the property 108.

As an example, the control unit 110 can refer to a schedule 120 that specifies timing conditions for providing different notifications when the control unit 110 detects a particular event or a particular set of events. In more detail, the schedule 120 specifies time ranges for notifying one or more of the occupants 102 and 104 when the control unit 110 detects that a baby 106 is crying. The schedule 120 can further indicate one or more types of outputs device or particular output devices to use depending on the timing conditions. For example, between 6:01 μm and 4:00 am, the schedule can indicate that the first occupant 102 should be notified through sleep buds worn by the first occupant 102 (e.g., the earbuds 112). However, between 4:01 am and 1:00 pm, the schedule can instead provide that the second occupant 104 should be notified through sleep buds worn by the second occupant 104. Finally, between 1:01 pm and 6:00 μm, the schedule can provide that both the first occupant 102 and the second occupant 104 should be notified through their respective mobile devices, such as their smart phones, tablet computing devices, or the like.

The schedule 120 can be set by occupants of the property 108. For example, the schedule 120 can be set by the occupant 102 through an interface of a mobile device. Alternatively, the schedule 120 can be generated by the control unit 110.

For example, the control unit 110 can use collected information to determine a sleep schedule for the first occupant 102 and a sleep schedule for the second occupant 104. The collected information can include, for example, calendars for the occupants that can include future events they plan on attending or tasks to complete, sensor data such as image or audio data indicating that an occupant is not in the bedroom of the property 108, alarm or sleep settings for an occupant (e.g., set by an occupant through the control unit 110 or on a mobile device that the control unit 110 can communicate with), or the like. As an example, over a period of time (e.g., a day, a week, a month, etc.), the control unit 110 can obtain information from the earbuds 112 (e.g., directly or indirectly through a mobile device of the occupant 102) indicating when the earbuds 112 are in use or information from a charging case for the earbuds 112 (e.g., directly or indirectly through a mobile device of the occupant 102) indicating when the earbuds 112 have been removed from the charging case and, therefore, are likely in use. The control unit 110 can use this information to generate a sleep schedule for the first occupant 102. The control unit 110 can also perform voice recognition on audio data obtained from the baby monitor 114 and/or facial recognition on image data obtained from the baby monitor 114 to determine times when the occupant 102 checks on the baby 106 and when the occupant 104 checks on the baby 106. Using the data for the earbuds 112 that indicate a sleep schedule for the occupant 102 and the sensor data from the baby monitor 114, the control unit 110 can generate the schedule 120.

The schedule 120 can be continually updated by the control unit 110 or can be dynamically modified by the control unit 110 in response to particular criteria being met. For example, if the occupant 104 starts a new job that requires her to work different hours, the control unit 110 can use changes to the occupant 104's calendar, alarm clock settings, or sensor data indicating changes to the occupant 104's sleep schedule (e.g., image data showing the occupant 104 going upstairs at night an hour earlier than typical and other image data showing the occupant 104 coming downstairs in the morning an hour earlier than typical, audio data indicating an alarm of the occupant 104's mobile device going off an hour earlier than typical, etc.) to determine a new sleep schedule for the occupant 104 and update the schedule 120 to account for the new sleep schedule.

As will be discussed in more detail with respect to FIG. 2, the control unit 110 can refer to data objects other than a schedule or in addition to a schedule. For example, the control unit 110 can reference a set of notification preferences to determine whether a notification should be generated, the content of the notification, or an output device for the notification. The notification preferences can be applicable to the property 108 or to a particular occupant of the property 108. For example, the occupant 102 can have a first set of notification preferences indicating that they would like to receive notifications through the earbuds 112 when a person is detected at a front door of the property 108. However, a different set of notification preferences for the occupant 104 can specify that the occupant 104 does not want to be notified when a person is detected at the front door of the property 108.

The notification preferences can be set by occupants of the property 108. For example, as discussed in more detail below with respect to FIG. 3B, an occupant can use an interface of their mobile device that communicates with the control unit 110 to set their own notification preferences. Additionally or alternatively, the control unit 110 can generate the notification preferences or update the notification preferences.

The notification data objects that the control unit 110 refers to can depend on a current state of the property. The state of the property 108 can be set by the control unit 110, e.g., based on settings provided by the occupants 102 and 104. The particular state of the property 108 that the control unit 110 places the property 108 in can depend on certain condition, such as the current time, whether all or a subset of occupants of the property 108 are at the property 108, whether all or a subset of occupants of the property 108 are away from the property 108, a day of the week (e.g., weekend day versus week day), a time of the year, or the like. In placing the property 108 into a particular state, the control unit 110 can perform one or more actions. For example, the control unit 110 can arm or unarm a security system of the property 108, lock or unlock doors of the property 108, close or open doors of the property 108 (e.g., garage door), turn on or off lights of the property 108, turn on or off appliances of the property 108, or enable or disable power supply to appliances or other devices of the property 108 in placing the property 108 in a particular state.

As will be discussed in more detail with respect to FIG. 3B, in response to receiving information indicating that the occupant 102 is wearing the earbuds 112, the control unit 110 can place the property 108 into a particular state. For example, in response to receiving this information from the earbuds 112 or from a mobile device of the occupant 102 connected to the earbuds 112, the control unit 110 can place the property 108 in a sleep state by arming a security system of the property 108, closing a garage door of the property 108 if not currently closed, locking the exterior doors of the property 108 if not currently locked, enabling one or more exterior flood lights of the property 108, and turning off the interior lights of the property 108.

In some implementations, the property monitoring system 100 uses information indicating that earbuds 112 are being worn to set a property state. For example, in response to receiving information from the occupant 102's smartphone indicating that the occupant 102 is wearing a set of sleep buds or other type of earbuds, the monitoring system can use the information to determine that the property 108 should be placed in a sleep state and proceed to perform a set of actions for the sleep state. In another example, the property monitoring system 100 receives information from the earbuds 112 indicating that the occupant 102 is wearing the earbuds 112.

In setting a state of the property 108, the property monitoring system 100 can arm a security system for the property 108, lock doors of the property 108 that are wirelessly connected to the control unit 110, close motorized doors of the property 108 such as a garage door, turn on lights of the property 108 such as outdoor flood lights, turn off lights of the property such as indoor lights, turn off or disable devices connected to the control unit 110, turn on or enable devices connected to the control unit 110, or change the operating mode of connected devices. For example, in response to determining that the property 108 should be placed in a sleep state, the monitoring system 100 can arm a security system of the property 108, lock the external doors of the property 108 using wirelessly connected door locks, activate external flood lights, turn off indoor lights, or the like.

FIG. 1 also illustrates a flow of data, shown as stages (A) to (D), with each representing a step in an example process. Stages (A) to (D) may occur in the illustrated sequence, or in a sequence that is different from the illustrated sequence. For example, some of the stages may occur concurrently.

In stage (A), the control unit 110 receives audio data indicating that the baby 106 is crying (120). For example, the control unit can receive audio data 116 from the baby monitor 114 and include audio captured by a microphone of the baby monitor 114. The baby monitor 114 may start collecting the audio data 116 and/or transmitting the audio data 116 to the control unit 110 in response to detecting noise that it recognizes as a baby crying or in response to detecting noise above a preset audio energy level.

In stage (B), the control unit uses the schedule 120 to identify one or more parents of the baby 106 to alert and generate a corresponding sleep bud alert 118 to notify the one or more parents (122). For example, the control unit 110 can identify a current time as 2:00 am and, based on the current time, determine, from the schedule 120, that the occupant 102 (e.g., "Parent 1" or "P1") should be notified through the earbuds 112 (e.g., the sleep buds the occupant 102 is currently wearing).

In some implementations, in generating a notification such as the alert 118, the property monitoring system 100 determines a message to be audibly presented to an occupant using speakers of the earbuds 112. The monitoring system 100 can select a message from a set of predetermined messages that correspond to different sets of conditions. Alternatively, the monitoring system 100 can generate a message using a template. As an example, based on detecting a particular event, the monitoring system 100 can select a message template corresponding to the event and fill in one or more fields of the template using recently acquired sensor data or other information.

For example, in generating the sleep bud alert, the control unit 110 can access a set of notification templates. The control unit 110 can select a particular template for a notification when it is detected that a baby is crying. The particular template selected by the control unit can additionally or alternatively be specific to the output device, e.g., the earbuds 112, or the type of output device, e.g., earbuds or sleep buds. The particular template selected can, for example, have one or more fields that are filed by the control unit 110 using information obtained from one or more of the connected devices, information accessed from storage by the control unit 110 or from one or more internal modules, analysis results generated by the control unit 110 analyzing information obtained from the connected devices and/or information obtained from storage, or the like. For example, a template for a baby crying notification can include a first field for a time when it was detected that the baby 106 started crying (e.g., time when the control unit received the audio data 116) and a second field for a level of audio energy detected (e.g., indicating how hard the baby is crying).

In some implementations, the control unit 110 does not generate a sleep bud alert notification until it determines that the baby 106 has been crying for a predetermined amount of time. For example, if the baby 106 is currently sleep training, the parents can set in the schedule 120 or through alert preferences a requirement that notifications should only be received if the baby 106 has been crying longer than 5 minutes, 10 minutes, or 20 minutes. This can provide a number of benefits in helping the baby 106 develop or improve their ability to self-sooth and improve parents sleep quality by reducing the amount of times that the parents are unnecessarily notified and have their sleep unnecessarily disturbed.

The audio alert 118 can include content in the form of sounds or messages that are to be audibly presented to the occupant 102 through the earbuds 112. For example, the audio alert 118 can include a message such as "ALERT! Baby is crying." The audio alert 118 can also include audio data of the baby 106 crying, e.g., all or a portion of the audio data 116. This can be a short clip of the baby 106 crying or can be a live feed of the baby 106 crying. To accomplish this, the control unit 110 may stream audio data received from the baby monitor 114 to the earbuds 112 or to a mobile device of the occupant 102 connected to the earbuds 112 over the network 150. The occupant 102 can use this content to determine whether or not the baby 106 is okay or whether intervention is needed. For example, the occupant 102 can listen to the live feed for a minute and, if the occupant 102 hears the baby 106 stop crying and fall back asleep, the occupant 102 can determine that no intervention is required and dismiss the audio alert 118.

The audio alert 118 can include additional or alternative content. For example, the audio alert 118 can include an alarm track that is played through the earbuds 112 before the message and the live audio feed to first wake the occupant 102 and place them in a condition for receiving and understanding the other content of the audio alert 118. The length the alarm track can be a preset amount of time that is used for all occupants (e.g., 30 seconds, 1 minute, etc.). Alternatively, the length of the alarm track can be particular to the occupant 102 based on preferences of the occupant 102 or observations by the control unit 110 from sensor data. For example, if sensor data received by the control unit 110 indicates that the occupant 102 alarm generally goes off for one minute before the occupant 102 wakes up, the control unit 110 can include a one minute long alarm track in the audio alert 118 to wake the occupant 102. Alternatively, the audio alert 118 can include instructions to have an alarm on the mobile device of the occupant 102 or accessible by the mobile device to be played through the earbuds 112 before content in the audio alert 118. The amount of time that the alarm is played for can be a predetermined amount of time that is used for all occupants or can be particular for the occupant 102.

In stage (C), the control unit 110 transmits the audio alert 118 to the sleep buds of the occupant 102 (124). For example, the control unit 110 can transmit the audio alert 118 to the earbuds 112 over the network 150. The control unit 110 may indirectly transmit the audio alert 118 to the earbuds 112 through a mobile device of the occupant 102. For example, the control unit 110 can transmit the audio alert 118 to the mobile device over the network 150 and then the mobile device provides the audio alert 118 for output to the earbuds 112 over a Bluetooth connection between the earbuds 112 and the mobile device.

As discussed above, where the audio alert 118 includes a live feed of audio data, the control unit 110 can stream audio data received from the connected device that is collecting the audio data to the earbuds 112. For example, the control unit 110 can form a stream of data between the baby monitor 114 and the earbuds 112 over the network 150.

In some implementations, the control unit 110 includes a microphone and can use the microphone to collect audio data. For example, if the control unit 110 is in the same room as the baby 106, the control unit 110 can use its microphone to monitor for the baby 106 crying without the need for a separate connected device such as the baby monitor 114.

After receiving the audio alert 118, the earbuds 112 can output the audio alert 118 using speakers of the earbuds. For example, the occupant 102 can hear the audio data 126 output by the earbuds 112 that includes a message (e.g., "ALERT! Baby is crying") and a live audio feed from the baby 106's room.

By providing the audio alert 118 through the earbuds 112 of the occupant 102, the control unit 110 can avoid disturbing the second occupant 104 (e.g., "Parent 2" or "P2"). By avoiding unnecessary disturbances, the monitoring system 100 can greatly improve the sleep quality of occupants of the property 108. Moreover, the monitoring system 100 also improves safety to vulnerable occupants such as the baby 106 or elderly living in the property 108. For example, by providing the audio alert 118 through sleep buds that are designed to block out other sounds or cancel sounds through active noise cancellation, the system 100 can notify occupants of events involving the vulnerable occupants. In addition, because the audio alert can be provided directly to the ear canal of the occupant 102 through the earbuds 112, there is a significantly improved likelihood that the occupant 102 will notice and response to the alert than if the alert was provided through other means such as a text message to a phone of the occupant 102.

In some implementations, if the control unit 110 determines that an occupant has not reacted to a notification, the control unit 110 can notify a different occupant or the same occupant through one or more other devices. For example, if the control unit 110 determines from image data collected by the baby monitor 114 that an occupant other than baby 106 has not entered the baby 106's room within a predetermined amount of time since the audio alert 118 was provided or accelerometer data collected from a mobile device of the occupant 102 indicates that the occupant 102 has not moved from the bed within a predetermined amount of time since the audio alert 118 was provided, the control unit 110 can generate a second alert (e.g., audio and visual alert) to provide the mobile device of the occupant 102 and to the mobile device of the occupant 104 (e.g., for audible output using speakers of the mobile devices and/or visual presentation using displays of the mobile devices).

In determining that a second alert notification should be generated and transmitted to the mobile devices of the occupants 102 and 104, the control unit 110 can refer to notification preferences for the property 108 or for the occupants 102 and 104. For example, the notification preferences can specify that a second audio alert should be sent to the mobile devices if it is determined that there is no reaction to the audio alert 118 within one minute, two minutes, or five minutes of transmission of the audio alert 118 and the most recently received audio data still indicates that the baby 106 is crying. In providing one or more backup notifications, the monitoring system 100 can further reduce risks to the health and safety of the baby 106.

In some implementations, at least a portion of the audio alert 118 is output through the earbuds 112 multiple times. For example, the control unit 110 may transmit the audio alert 118 continually such as periodically (e.g., every 30 seconds, every minute, every five minutes, etc.) until it receives data indicating an acknowledgement of the audio alert 118. The acknowledgement can be data indicating that earbuds 112 have been removed from the ears of the occupant 102 (e.g., as detected by IR sensors of the earbuds 112), data indicating that a button on the earbuds 112 has been pressed (e.g., push button) or touched (e.g., capacitive touch button), data indicating that the earbuds 112 have been placed back in their charging case, or data indicating that the occupant 102 has interacted with a corresponding interface element (e.g., an alert message) on a display of a computing device of the occupant 102 such as a smart phone.

As another example, the control unit 110 can provide instructions for a computing device wirelessly connected to the earbuds 112 to repeat the message "ALERT! Baby is crying" every 30 seconds, minute, or five minutes until the computing devices detects the occupant 102's interaction with a button on the earbuds 112, removal of the earbuds

112, placing of the earbuds 112 in their charging case, or interaction with a particular interface element displayed on the computing device.

In some implementations, the property monitoring system 100 determines classifications for notifications and uses the classifications to determine whether a notification should be transmitted to the earbuds 112. As an example, the control unit 110 can classify notifications into a high-importance notification classification, a medium-importance notification classification, or a low-importance notification classification. Preferences set by an occupant can indicate, for example, that the only high-importance notifications should be sent to the earbuds 112. The classifications can be created by the occupants 102 and 104 and allow the occupants 102 and 104 to place different types of notifications into the classifications.

In some implementations, the property monitoring system 100 uses machine learning to determine whether a notification should be sent to the earbuds 112. For example, the monitoring system 100 can use pattern recognition or a clustering model to identify multiple sets of conditions that indicate when an occupant should or should not receive notifications through the earbuds 112. As another example, the monitoring system 100 can train a machine learning model using notifications preferences set by the occupants 102 and 104, or set by other occupants, such as occupants of other properties. The machine learning model can be updated over time using occupant feedback. As an example, the monitoring system 100 may request feedback after providing a notification to earbuds worn by an occupant in response to detection of a particular event and with the property 108 in a particular state, such as a sleep state. If the monitoring system 100 receives feedback indicating that the notification should not have been sent to the earbuds 112, the monitoring system 100 can use the feedback to update the machine learning model to reduce the likelihood of the control unit 110 sending a notification to the earbuds when the same or similar conditions are detected.

Figure 2:
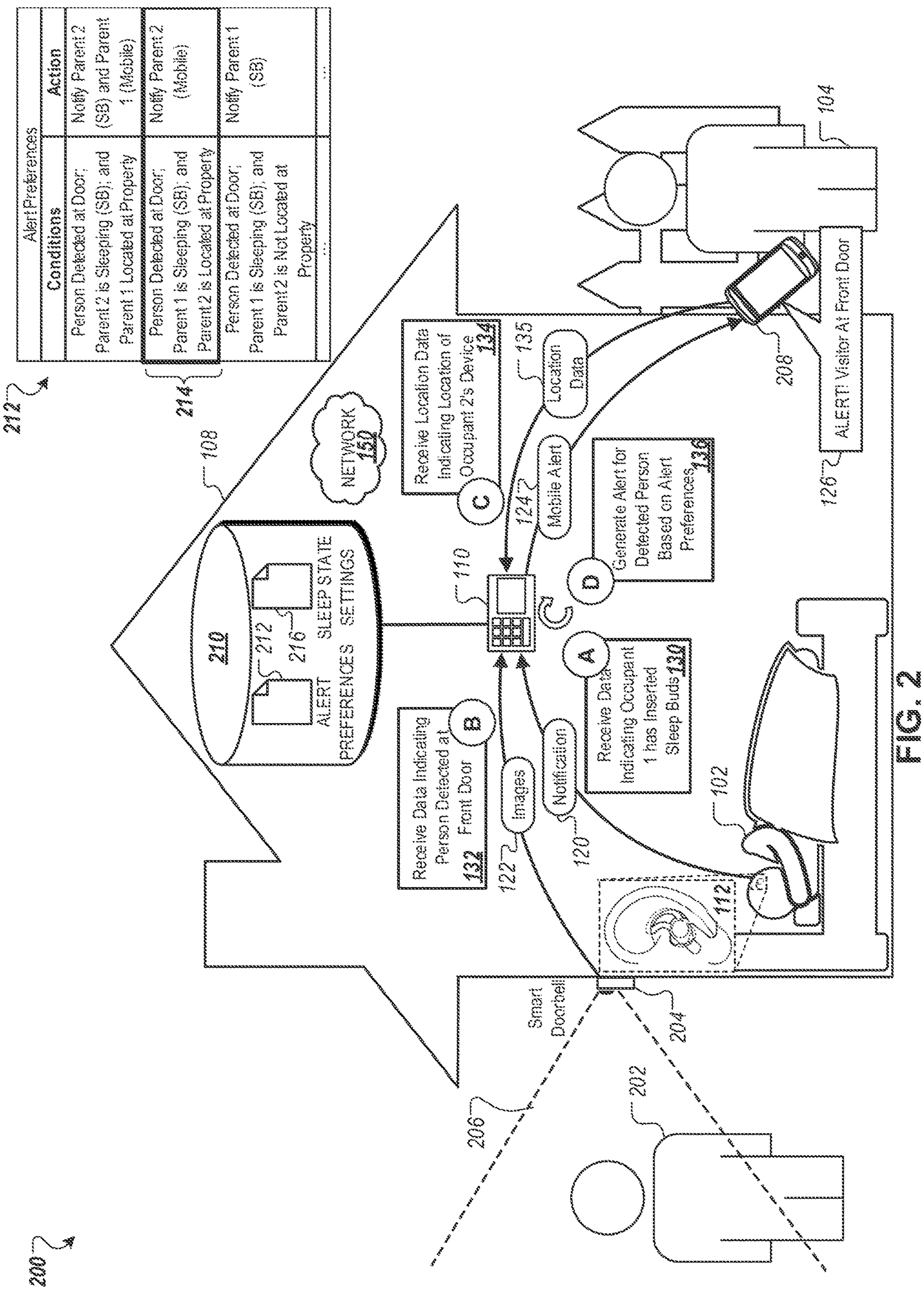
FIG. 2 is a diagram showing an example of a property monitoring system integrated with earbuds.

FIG. 2 is a diagram showing an example of a property monitoring system 200 integrated with the earbuds 112. The property monitoring system 200 can be the property monitoring system 100 described above with respect to FIG. 1.

The property monitoring system 200 includes the control unit 110 configured to communicate with a database 210, the earbuds 112, a computing device 208, and one or more connected sensing devices. The computing device 208 can be a mobile computing device, such as a smart phone, a tablet computer, a PDA, a laptop computer, or the like. The one or more connected sensing devices can include a smart doorbell 204 that includes a camera with a field of view 206. The smart doorbell 204 can communicate with the control unit 110 over the network 150 to transmit image data collected by the camera of the smart doorbell 204 from the front door of the property 108.

The database 210 can be onsite storage that is located at the property 108. Alternatively, the database 210 can be part of an external computing system such as a remote server system. For example, the database 210 can be cloud computing storage.

As shown the database 210 stores alert preferences 212 and a sleep state settings 216. The alert preferences 212 can specify actions for the property monitoring system 200 to take in response to detecting particular events. For example, the alert preferences 212 can specify when the occupants 102 and 104 should be notified and how (e.g., through what device) they should be notified.

The alert preferences 212 can include multiple sets of conditions where each set corresponds to a particular action or set of actions. For example, the alert preferences 212 can include a first set of conditions that include a first condition of detecting a person at a front door, a second condition of the second occupant 104 detected as sleeping, and a third condition of the first occupant 102 being located at the property 108 (e.g., within a threshold distance from a geographic location for the property 108, such as GPS coordinates for the center of the property 108; within a geofence that defines the property 108 or a portion of the property 108; or connected to a local network or network device of the property 108 using a short distance protocol such as NFC or Bluetooth). When the control unit 110, for example, detects that all three of these conditions are met, the control unit 110 can, in response and as specified in the alert preferences 212, generate a first notification to send to the earbuds 112 worn by the occupant 104 and a second notification to send to the mobile computing device of the occupant 102.

The alert preferences 212 can include parameters or settings for notifications to be generated in response to one or more corresponding conditions being detected. These parameters or settings can indicate content for the notification, a template to use for the notification (e.g., message template containing one or more fields), a type of device that should receive the notification, an ID for a particular device to receive the notification, a number indicating the number of times that the notification should be sent, a time indication of a delay between sending a notification and sending a subsequent notification (e.g., until a response is received indicating that the notification has been acknowledged), etc.

The sleep state settings 216 can include conditions for determining if the property 108 is in a sleep state, actions for the property monitoring system 200 to take if the property 108 is in a sleep state, or both. For example, the sleep state settings 216 may specify that the property 108 enters a sleep state when the current time is between 9:00 pm and 8:00 am, at least one of the occupants 102 and 104 are detected in the property 108, and data is received indicating that the earbuds 112 (e.g., sleep buds) are being worn by the occupant in the property 108. For example, the earbuds 112 can include a proximity (or other) sensor(s) that detects when the earbud is inserted into a portion of a user's ear canal. The sensor can detect that the user is wearing the earbuds 112 (e.g., sleep buds) and convey data indicating the sleep buds are being worn by the occupant. The data may be conveyed via control signaling to a receiving device of the property monitoring system 200. The sleep state settings 216 may further specify that in response to the property 108 entering the sleep state, the control unit 110 should lock the external doors of the property 108, turn off the internal lights of the property, and refer to the alert preferences 212 for generating notifications.

The database 210 can include a set of multiple alert preferences for different states of the property 108. For example, the alert preferences 212 can be alert preferences used by the control unit 110 when the control unit 110 determines that the property 108 is in a sleep state (e.g., using the sleep state settings 216). In more detail, if the sleep state settings 216 indicates that the property 108 enters a sleep state when it is determined that (i) the current time is between 9:00 pm and 8:00 am and (ii) when the earbuds 112 (e.g., sleep buds) are worn. In response to determining that property 108 has entered the sleep state, the control unit 110 can obtain or refer to the alert preferences 212 for identifying conditions that trigger corresponding actions. If, however, the control unit 110 determines that the property 108 has entered a different state, e.g., an away state (e.g., when the occupants 102 and 104 are determined to be away from the property 108 or away from the property 108 for a threshold amount of time), the control unit 110 may obtain or refer to a different set of alert preferences for the different state. These different alert preferences can includes (i) conditions not in the preferences 212 that trigger one or more actions in the alert preferences 212, (ii) conditions in the preferences 212 that trigger one or more actions not in the alert preferences 212, or (iii) conditions not in the preferences 212 that trigger one or more actions not in the alert preferences 212.

As described below with respect to FIG. 3B, the alert preferences 212 can be set by a user, such as the occupant 102 or the occupant 104, through an interface of the computing device 208 or another computing device.

As described below with respect to FIG. 3A, the sleep state settings 216 can be defined by a user, such as the occupant 102 or the occupant 104, through an interface of the computing device 208 or another computing device.

In some implementations, the property monitoring system 200 can determine a state of the property 108 or detect an event occurring at the property 108 using sensor data collected from a set of sensors of the property monitoring system 200. These sensors can include, for example, security cameras, the smart video doorbell 204, motion detectors, magnetic door and window sensors, or the like. The property monitoring system 200 can also collect and use other information, such as location data from mobile devices of occupants of the property 108 and information indicating whether the set of earbuds 112 are in use.

As an example, using location data from smart phones of the occupants 102 and 104 that indicates that the occupant 102 is at the property 108 and that the occupant 104 is away, video data from security cameras at the property 108 indicating that the first occupant 102 is not downstairs or outside, and information from a set of sleep buds indicating that one sleep bud is currently being worn, the property monitoring system 200 can determine the occupant 102 is asleep in the upstairs bedroom and that the occupant 104 is away. Based on these determinations, the property monitoring system 200 can, for example, use the sleep state settings 216 to determine that the property 108 is in a sleep state. The property monitoring system 200 can also use the alert preferences 212 for the sleep state to determine that any notifications for detected events should be sent to a smart phone of the occupant 104 and to the sleep bud worn by the occupant 102.

FIG. 2 also illustrates a flow of data, shown as stages (A) to (D), with each representing a step in an example process. Stages (A) to (D) may occur in the illustrated sequence, or in a sequence that is different from the illustrated sequence. For example, some of the stages may occur concurrently.

In stage (A), the control unit 110 receives data indicating that the occupant 102 has inserted the earbuds 112 (e.g., sleep buds) (130). This data can be data indicating that the earbuds 112 have been removed from a charging case for the earbuds 112, or data indicating that one or more of the earbuds 112 have been inserted into the occupant 102's ear(s). For example, the earbuds 112 can include IR sensors that collect sensor data that the earbuds 112 can use to determine whether the earbuds 112 are currently being worn or not. In response to detecting that the earbuds 112 are being worn, the earbuds 112 can transmit data indicating that the earbuds 112 are being worn to the control unit 110 directly or indirectly through a computing device such as a smart phone of the occupant 102.

The control unit 110 can receive the data indicating that the occupant 102 has inserted the earbuds 112 from the earbuds 112, a charging case for the earbuds 112, a computing device connected to the earbuds 112 such as smart phone of the occupant 102, or from a combination of these sources. This data can be received in response to the control unit 110 requesting information from the earbuds 112, from the charging case, from the smart phone, or from a combination of these sources. The control unit 110 may send a request for information continually such as periodically, in response to certain events (e.g., detecting that the occupant 102 has entered the bedroom of the property 108), or both. The earbuds 112, the charging case, or the smart phone may transmit the data to the control unit 110 without receiving a request from the control unit 110. For example, the smart phone of the occupant 102 can transmit the data to the control unit 110 in response to detecting that the earbuds 112 were removed from their charging case or in response to detecting that the earbuds 112 have been wirelessly connected to the smart phone.

After receiving the data indicating that the occupant 102 has inserted the earbuds 112, the control unit 110 can use the sleep state settings 216 to determine that the property 108 has entered a sleep state. Base on this determination, the control unit 110 may take one or more actions such as locking or closing doors of the property 108, turning off lights of the property 108, etc. The control unit 110 can also refer to the alert preferences 212 in response to determining that the property 108 has entered the sleep state and monitor for conditions specified in the alert preferences 212 that trigger actions.

After receiving the data indicating that the occupant 102 has inserted the earbuds 112, the control unit 110 can use the alert preferences 212 to determine that a second condition of an entry 214 of the alert preferences 212 is met. For example, based on receiving data indicating that the occupant 102 is wearing the earbuds 112, the control unit 110 can determine that the occupant 102 is asleep or assume that the occupant 102 is asleep. The control unit 110 can also use information from one or more other connected sensing devices to make this determination or confirm this determination, such as location data indicating that the occupant 102 is located at the property 108, image data collected by a camera indicating that the occupant 102 entered the bedroom of the property 108, etc.

In stage (B), the control unit 110 receives data from a connected sensing device indicating an event at the property 108 (132). For example, the control unit 110 may receive image data from the smart doorbell 204 containing an image of a person 202 at a front door of the property. The control unit 110 may additionally or alternatively receive a notification from the smart doorbell 204 indicating that a person has been detected at the front door of the property 108. This data can be received in response to the control unit 110 requesting information from the smart doorbell 204. For example, the control unit 110 may send a request for information to the smart doorbell 204 continually such as periodically (e.g., every minute, every 30 seconds, etc.), in response to certain events (e.g., detecting that the occupant 102 has entered the bedroom of the property 108), or both. The smart doorbell 204 may transmit the data to the control unit 110 without receiving a request from the control unit 110. For example, the smart doorbell 204 may transmit the data in response to detecting a person at the front door of the property, in response to detecting motion at the front door, etc.

After receiving the data indicating that there is a person at the front door of the property 108, the control unit 110 can use the alert preferences 212 to determine that a first condition of the entry 214 is met. For example, the control unit 110 can perform facial recognition on image data received from the smart doorbell 204 and, based on the results, determine that a person is located at the front door of the property 108.

In stage (C), the control unit receives location data 135 from a computing device of an occupant of the property 108 (134). For example, the control unit 110 can receive GPS coordinates from the computing device 208 or communication packets indicating that the computing device 208 is at or near the property 108. For example, the communication packets can indicate that the computing device 208 is communicating with the control unit 110 or another device at the property 108 over a local network for the property 108 and/or using a short distance communication protocol (e.g., Bluetooth or NFC).

After receiving the location data 135, the control unit 110 can use the location data 135 to determine if the occupant 104 is at the property 108. For example, if the location data 135 includes GPS coordinates for the computing device 208, the control unit 110 can compare the GPS coordinates to GPS coordinates for the center of the property 108 to determine that the computing device 208, and therefore the occupant 104, is within a threshold distance of the property 108 (e.g., 5 meters, 10 meters, 20 meters, etc.).

After receiving the location data indicating that the occupant 104 is located at the property 108, the control unit 110 can use the alert preferences 212 to determine that the third condition of the entry 214 is met.

At stage (D), the control unit 110 generates an alert based on alert preferences (136). For example, the control unit 110 can determine from the alert preferences 212 that all of the conditions of the entry 214 have been met. In response to this determination, the control unit 110 can perform the actions of the entry 214 by generating an alert notification for the computing device 208 of the occupant 104. The notification can include a message indicating that there is a person at the front door of the property 108. The notification can include other information, such as an image, video, or video stream captured by the smart doorbell 204.

In some implementations, the control unit 110 can also or alternatively generate and transmit a notification to the earbuds 112 to wake the occupant 102 in response to a detected event (e.g., in response to detecting a person at the front door of the property 108). The notification can include an alarm to wake the occupant 102 from sleep. The notification can additionally or alternatively include a message that informs that occupant 102 that a person is located at the front door, that a person has knocked on the front door, that a person has rung the smart doorbell 204, etc. The alarm and/or message can be played through speakers of the earbuds 112.

In some implementations, the control unit 110 can generate and transmit alerts to the earbuds 112 that notify an occupant of emergency events. This events can include the detection of a suspicious person outside of the property 108 (e.g., person within a threshold distance of the property 108 after the property 108 has entered a sleep state), detection of an intruder inside the property 108, detection of a break-in at the property 108, detection of smoke, detection of fire, or detection of carbon monoxide. Depending on the event, the notification generated by the control unit 110 may only be sent to the earbuds 112 or only a particular notification may be sent to the earbuds 112. For example, in response to detecting an intruder or a break-in, the control unit 110 may sound a general alarm of the property 108 in hopes of scaring off any intruders and transmit a notification only to the earbuds 112 so as to not alert any intruders as to the location of the occupants which may occur with a smart phone notification.

The notifications sent by the control unit 110 can also include content to help the occupants of the property 108 move to a safe location. For example, the notifications sent to the earbuds 112 may include a message or a series of messages that guide the occupant through a safe route out of the property 108 so as to avoid a detected fire. As another example, the control unit 110 can provide an earbud notification that includes a message notifying the occupant of a detected intruder's location in the property 108 so the occupant can avoid the intruder. The control unit 110 can continue to send earbud notifications continually to the earbuds 112 as the intruder changes location in the property 108 and/or periodically (e.g., update every 10 seconds, 30 seconds, etc.). The control unit 110 can additionally send one or more notifications with instructions to guide the occupant out of the property 108 along a route that avoids the detected intruder.

Figure 3B:
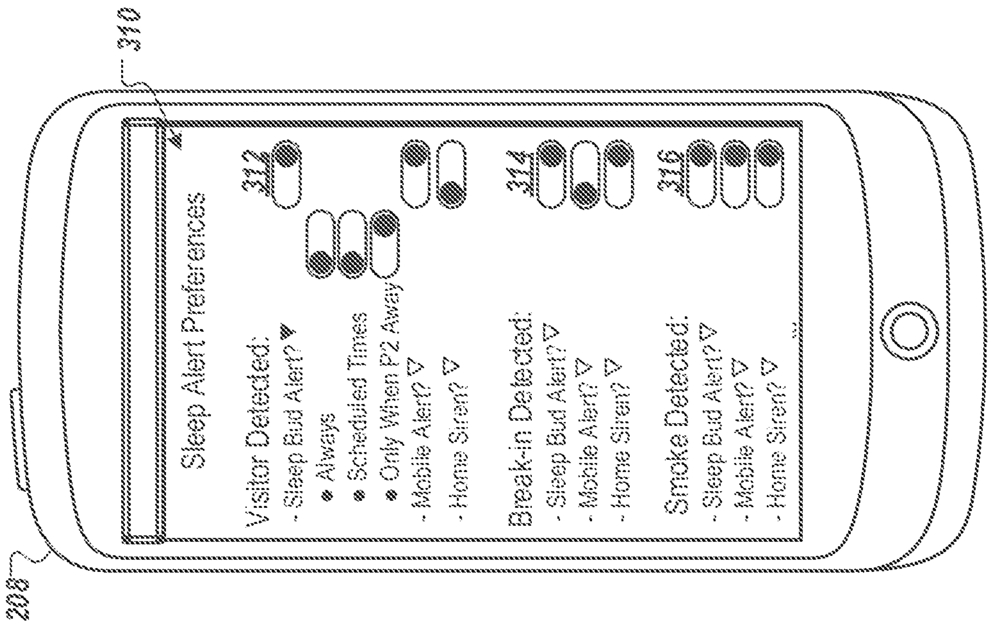
FIGS. 3A-3B are diagrams showing example interfaces for configuring settings for a property monitoring system.
Figure 3A:
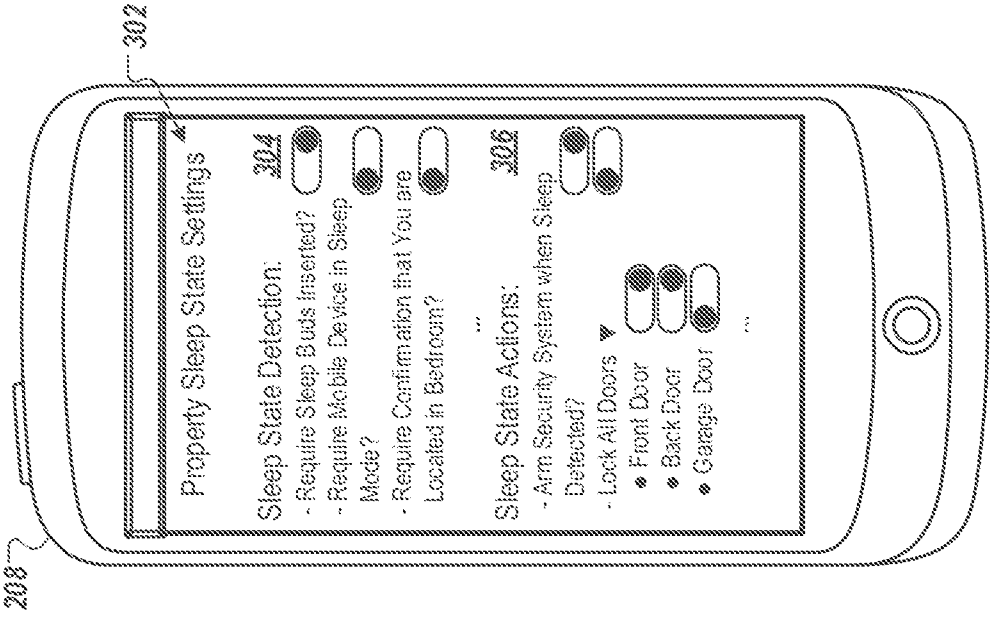

FIGS. 3A-3B are diagrams showing example interfaces for configuring settings for the property monitoring system 100 described above with respect to FIG. 1 or the property monitoring system 200 described above with respect to FIG. 2.

FIG. 3A is diagram showing an example interface 302 for providing property sleep state settings. A user of the computing device 208 (e.g., the occupant 102 or the occupant 104) can use a first interface area 304 of the interface 302 to define the sleep state of the property and a second interface area 306 to indicate what actions should be taken by the control unit 110 in response to the property 108 entering sleep state.

For example, the user can interact with interface elements in the first interface area 304 to define the sleep state of the property 108 as requiring a determination that the earbuds 112 are worn without requiring the computing device of the user to be in a sleep mode and without requiring the user to be in a bedroom of the property 108. Various other parameters can be used to define the sleep state for the property 108. For example, these other parameters can include a time range, a day of the week, a customized schedule (e.g., that indicates multiple time ranges for different days, weeks, and/or months) when a sleep state can be entered.

As another example, the user can interact with interface elements in the second interface area 306 to specify what actions the control unit 110 should take in response to the property 108 entering a sleep state. As shown, the user can specify that, in response to the property 108 entering a sleep state, the security system of the property 108 will be armed, that a smart lock installed on the front door will be locked, and that a smart lock on the back door will be locked. The control unit 110 can perform various other actions in response to detecting that the property 108 has entered a sleep state. For example, the user can use the interface 302 to specify that the control unit 110 should close doors of the property 108 such as a garage door of the property 108, turn off connected devices of the property 108 such as interior and/or exterior lights of the property 108, turn on or enable connected devices such as exterior flood lights of the property 108, or change the operating mode of connected devices.

The interface 302 can be presented on a computing device of an occupant of the property 108. For example, the interface 302 can be presented on the computing device 208 of the occupant 104.

The property sleep state settings selected in the interface 302 can be the sleep state settings 216 or used to generate the sleep state settings 216 described above with respect to FIG. 2.

FIG. 3B is diagram showing an example interface 310 for setting sleep alert preferences. The sleep alert preferences set may be for all occupants of the property 108 or for the particular user of the computing device 208 (e.g., the occupant 104). The sleep alert preferences can be the preferences used by the control unit 110 when the control unit 110 determines that the property 108 has entered a sleep state.

The interface 310 can include multiple interface areas that correspond to different events detected at the property 108. The user of the computing device 208 (e.g., the occupant 102 or the occupant 104) can use a first interface area 312 of the interface 310 to set notification preferences for when a visitor is detected at the property 108 (e.g., while in sleep state), a second interface area 314 to set notification preferences when a break-in is detected at the property (e.g., while in sleep state), and a third interface area 316 to set notification preferences when smoke is detected at the property (e.g., while in sleep state).

For example, the user of the computing device 208 can interact with interface elements (e.g., toggles, switches, text fields, drop-down menus, etc.) in the first interface area 312 to specify that, when a visitor is detected and the property 108 is in a sleep state, the control unit 110 should generate an earbud notification and transmit the earbud notification to the earbuds 112 if the occupant 104 ("P2" or "Parent 2") is away from the property 108, that the control unit 110 should generate a mobile notification and transmit the mobile notification to mobile devices of the occupants 102 and 104 of the property 108, and that the home siren for the property 108 should not be turned on.

The sleep alert preferences selected in the interface 310 can be the alert preferences 212 or used to generate the alert preferences 212 described above with respect to FIG. 2.

Figure 4:
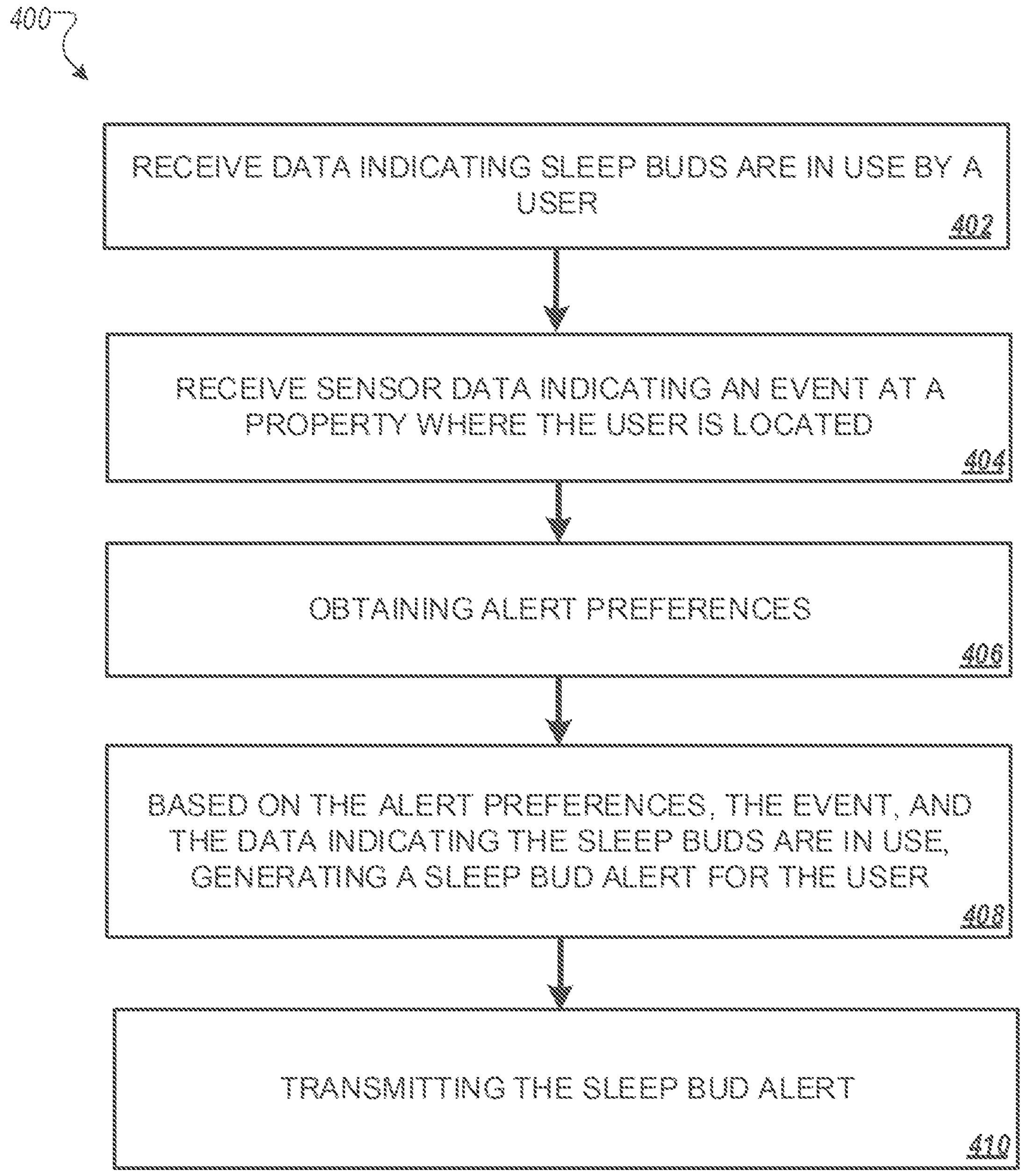
FIG. 4 is a flow diagram illustrating an example process for generating sleep bud alerts.

FIG. 4 is a flow diagram illustrating an example process 400 for generating sleep bud alerts. The process can be performed, at least in part, by the property monitoring system 100 described above with respect to FIG. 1, the property monitoring system 200 described above with respect to FIG. 2, or the home monitoring system 500 described below with respect to FIG. 5. For example, the process 400 can be performed by the control unit 110 shown in FIGS. 1-2. As another example, the process 400 can be performed by the control unit 510 shown in FIG. 5.

The process 400 includes receiving data indicating sleep buds are in use by a user (402). For example, with respect to FIG. 1, the control unit 110 can receive a notification indicating that the sleep buds (e.g., the earbuds 112) have been removed from their charging case. The control unit 110 can receive this notification from the sleep buds or from a computing device, such as a smart phone that is wirelessly connected to the sleep buds (e.g., over a Bluetooth connection).

Based on receiving the data indicating that the sleep buds are in use, the control unit 110 can determine that the property 108 is in a sleep state. For example, the sleep buds being in use (e.g., being connected to the control unit 110 or to a mobile device of the user; being taken out of their charging case; or detected in the ear of the user through a capacitive touch sensor of the sleep buds or earbuds) can be one of one or more conditions for determining that the property 108 is in a sleep state by the control unit 110.

The process 400 includes receiving sensor data indicating an event at a property where the user is located (404). The control unit 110 can receive sensor data from one or more sensing devices of the property monitoring system 100. For example, with respect to FIG. 1, the control unit 110 can receive the audio data 116, image data, or a combination of the audio data 116 and image data from the monitor 114. The received audio data 116 can include a digital audio recording of the baby 106 crying. The control unit 110 can detect a baby crying event from the received audio data 116.

Based on the sensor data received, the control unit 110 can identify the event. The event can be an event occurring at the property 108. For example, with respect to FIG. 2, the sensor data can be images obtained by the smart doorbell 204 and the event can be detection of a visitor at the front door of the property.

In some implementations, in addition to or in place of sensor data, a notification identifying an event is received. For example, with respect to FIG. 2, in addition to or in place of image data, the smart doorbell 204 can provide the control unit a notification indicating that a person has been detected at the front door. The smart doorbell 204 may make this determination itself by applying facial recognition techniques to its captured images or through the leveraging of processing power of a remote computing system, such as a remote server, to perform facial or other image recognition on captured images.

The process 400 includes obtaining alert preferences (406). The alert preferences can be obtained by the control unit 110 can be for a particular state of the property 108. For example, with respect to FIG. 2, the alert preferences 212 obtained by the control unit 110 can be sleep alert preferences when the control unit 110 determines that the property 108 is in a sleep state based on the sleep state settings 216 for the property 108. The alert preferences can include conditions for generating different types of alerts such as sleep bud alerts. The conditions can include the detection of particular events, such detection of a baby crying, a visitor, smoke, fire, a break-in, an intruder, etc.

The alert preferences can also be general preferences applicable to the property 108, e.g., applicable to all occupants of the property 108. Alternatively, the alert preferences can be preferences of a particular occupant of the property 108.

The process 400 includes generating a sleep bud alert for the user based on the alert preferences, the event, and the data indicating the sleep buds are in use (408). The control unit 110 can, for example, use the obtained alert preferences that correspond to the sleep state of the property to determine that a sleep bud alert should be generated for the event. The alert can include, for example, an alarm intended to wake the user. The alert can also or alternatively include a message.

The process 400 includes transmitting the sleep bud alert (410). For example, the control unit 110 can transmit the sleep bud alert directly to the earbuds 112 or to a computing device wirelessly connected to the earbuds 112, such as a smart phone of the occupant 102. The transmission can be made over a wireless network, such as a local Wi-Fi network, a cellular network, or the like.

Figure 5:
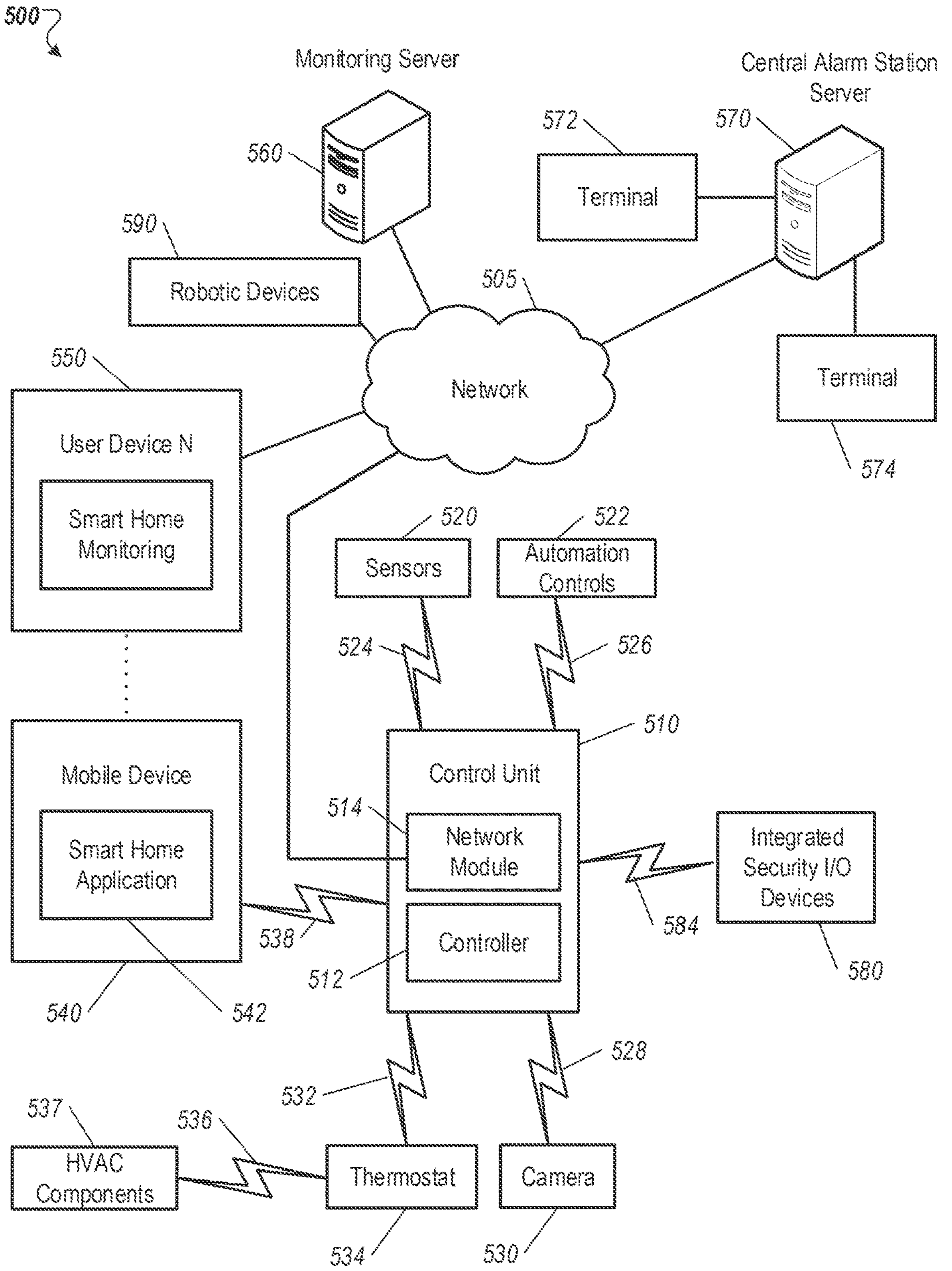
FIG. 5 is a block diagram illustrating an example security monitoring system.

FIG. 5 is a diagram illustrating an example of a home monitoring system 500. The monitoring system 500 includes a network 505, a control unit 510, one or more user devices 540 and 550, a monitoring server 560, and a central alarm station server 570. In some examples, the network 505 facilitates communications between the control unit 510, the one or more user devices 540 and 550, the monitoring server 560, and the central alarm station server 570.

In some implementations, the control unit 510 can be the control unit 110 and the network 505 can be the network 150 described above with respect to FIGS. 1-2.

In some implementations, the user devices 540 and 550 include the earbuds 112, a computing device such as a smart phone wirelessly connected to the earbuds 112, or both.

The network 505 is configured to enable exchange of electronic communications between devices connected to the network 505. For example, the network 505 may be configured to enable exchange of electronic communications between the control unit 510, the one or more user devices 540 and 550, the monitoring server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network. The network 505 may be a local network and include, for example, 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CATS) or Category 6 (CAT6) wired Ethernet network. The network 505 may be a mesh network constructed based on the devices connected to the mesh network.

The control unit 510 includes a controller 512 and a network module 514. The controller 512 is configured to control a control unit monitoring system (e.g., a control unit system) that includes the control unit 510. In some examples, the controller 512 may include a processor or other control circuitry configured to execute instructions of a program that controls operation of a control unit system. In these examples, the controller 512 may be configured to receive input from sensors, flow meters, or other devices included in the control unit system and control operations of devices included in the household (e.g., speakers, lights, doors, etc.). For example, the controller 512 may be configured to control operation of the network module 514 included in the control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit 510 to communicate over a local area network and/or the Internet. The network module 514 also may be a voice band modem configured to enable the alarm panel to communicate over the telephone lines of Plain Old Telephone Systems (POTS).

The control unit system that includes the control unit 510 includes one or more sensors. For example, the monitoring system may include multiple sensors 520. The sensors 520 may include a lock sensor, a contact sensor, a motion sensor, or any other type of sensor included in a control unit system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 520 can also include a radio-frequency identification (RFID) sensor that identifies a particular article that includes a pre-assigned RFID tag.

The control unit 510 communicates with the home automation controls 522 and a camera 530 to perform monitoring. The home automation controls 522 are connected to one or more devices that enable automation of actions in the home. For instance, the home automation controls 522 may be connected to one or more lighting systems and may be configured to control operation of the one or more lighting systems. In addition, the home automation controls 522 may be connected to one or more electronic locks at the home and may be configured to control operation of the one or more electronic locks (e.g., control Z-Wave locks using wireless communications in the Z-Wave protocol). Further, the home automation controls 522 may be connected to one or more appliances at the home and may be configured to control operation of the one or more appliances. The home automation controls 522 may include multiple modules that are each specific to the type of device being controlled in an automated manner. The home automation controls 522 may control the one or more devices based on commands received from the control unit 510. For instance, the home automation controls 522 may cause a lighting system to illuminate an area to provide a better image of the area when captured by a camera 530.

The camera 530 may be a video/photographic camera or other type of optical sensing device configured to capture images. For instance, the camera 530 may be configured to capture images of an area within a building or home monitored by the control unit 510. The camera 530 may be configured to capture single, static images of the area and also video images of the area in which multiple images of the area are captured at a relatively high frequency (e.g., thirty images per second). The camera 530 may be controlled based on commands received from the control unit 510.

The camera 530 may be triggered by several different types of techniques. For instance, a Passive Infra-Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra-Red, Z-wave controlled "white" lights, lights controlled by the home automation controls 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the control unit 510. The camera 530 may employ a small solar cell to recharge the battery when light is available. Alternatively, the camera 530 may be powered by the controller 512's power supply if the camera 530 is co-located with the controller 512.

In some implementations, the camera 530 communicates directly with the monitoring server 560 over the Internet. In these implementations, image data captured by the camera 530 does not pass through the control unit 510 and the camera 530 receives commands related to operation from the monitoring server 560.

The system 500 also includes thermostat 534 to perform dynamic environmental control at the home. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a home and/or environmental data at a home, e.g., at various locations indoors and outdoors at the home. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit 510 and can control the environmental (e.g., temperature) settings based on commands received from the control unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534. In some implementations, the thermostat 534 is controlled via one or more home automation controls 522.

A module 537 is connected to one or more components of an HVAC system associated with a home, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

In some examples, the system 500 further includes one or more robotic devices 590. The robotic devices 590 may be any type of robots that are capable of moving and taking actions that assist in home monitoring. For example, the robotic devices 590 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 590 may be devices that are intended for other purposes and merely associated with the system 500 for use in appropriate circumstances. For instance, a robotic vacuum cleaner device may be associated with the monitoring system 500 as one of the robotic devices 590 and may be controlled to take action responsive to monitoring system events.

In some examples, the robotic devices 590 automatically navigate within a home. In these examples, the robotic devices 590 include sensors and control processors that guide movement of the robotic devices 590 within the home. For instance, the robotic devices 590 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 590 may include control processors that process output from the various sensors and control the robotic devices 590 to move along a path that reaches the desired destination and avoids obstacles. In this regard, the control processors detect walls or other obstacles in the home and guide movement of the robotic devices 590 in a manner that avoids the walls and other obstacles.

In addition, the robotic devices 590 may store data that describes attributes of the home. For instance, the robotic devices 590 may store a floorplan and/or a three-dimensional model of the home that enables the robotic devices 590 to navigate the home. During initial configuration, the robotic devices 590 may receive the data describing attributes of the home, determine a frame of reference to the data (e.g., a home or reference location in the home), and navigate the home based on the frame of reference and the data describing attributes of the home. Further, initial configuration of the robotic devices 590 also may include learning of one or more navigation patterns in which a user provides input to control the robotic devices 590 to perform a specific navigation action (e.g., fly to an upstairs bedroom and spin around while capturing video and then return to a home charging base). In this regard, the robotic devices 590 may learn and store the navigation patterns such that the robotic devices 590 may automatically repeat the specific navigation actions upon a later request.

In some examples, the robotic devices 590 may include data capture and recording devices. In these examples, the robotic devices 590 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 590 to take and store a biometric sample that can be used to identify the person (e.g., a biometric sample with DNA that can be used for DNA testing).

In some implementations, the robotic devices 590 may include output devices. In these implementations, the robotic devices 590 may include one or more displays, one or more speakers, and/or any type of output devices that allow the robotic devices 590 to communicate information to a nearby user.

The robotic devices 590 also may include a communication module that enables the robotic devices 590 to communicate with the control unit 510, each other, and/or other devices. The communication module may be a wireless communication module that allows the robotic devices 590 to communicate wirelessly. For instance, the communication module may be a Wi-Fi module that enables the robotic devices 590 to communicate over a local wireless network at the home. The communication module further may be a 900 MHz wireless communication module that enables the robotic devices 590 to communicate directly with the control unit 510. Other types of short-range wireless communication protocols, such as Bluetooth, Bluetooth LE, Z-wave, Zigbee, etc., may be used to allow the robotic devices 590 to communicate with other devices in the home. In some implementations, the robotic devices 590 may communicate with each other or with other devices of the system 500 through the network 505.

The robotic devices 590 further may include processor and storage capabilities. The robotic devices 590 may include any suitable processing devices that enable the robotic devices 590 to operate applications and perform the actions described throughout this disclosure. In addition, the robotic devices 590 may include solid-state electronic storage that enables the robotic devices 590 to store applications, configuration data, collected sensor data, and/or any other type of information available to the robotic devices 590.

The robotic devices 590 are associated with one or more charging stations. The charging stations may be located at predefined home base or reference locations in the home. The robotic devices 590 may be configured to navigate to the charging stations after completion of tasks needed to be performed for the monitoring system 500. For instance, after completion of a monitoring operation or upon instruction by the control unit 510, the robotic devices 590 may be configured to automatically fly to and land on one of the charging stations. In this regard, the robotic devices 590 may automatically maintain a fully charged battery in a state in which the robotic devices 590 are ready for use by the monitoring system 500.

The charging stations may be contact based charging stations and/or wireless charging stations. For contact based charging stations, the robotic devices 590 may have readily accessible points of contact that the robotic devices 590 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 590 may charge through a wireless exchange of power. In these cases, the robotic devices 590 need only locate themselves closely enough to the wireless charging stations for the wireless exchange of power to occur. In this regard, the positioning needed to land at a predefined home base or reference location in the home may be less precise than with a contact based charging station. Based on the robotic devices 590 landing at a wireless charging station, the wireless charging station outputs a wireless signal that the robotic devices 590 receive and convert to a power signal that charges a battery maintained on the robotic devices 590.

In some implementations, each of the robotic devices 590 has a corresponding and assigned charging station such that the number of robotic devices 590 equals the number of charging stations. In these implementations, the robotic devices 590 always navigate to the specific charging station assigned to that robotic device. For instance, a first robotic device may always use a first charging station and a second robotic device may always use a second charging station.

In some examples, the robotic devices 590 may share charging stations. For instance, the robotic devices 590 may use one or more community charging stations that are capable of charging multiple robotic devices 590. The community charging station may be configured to charge multiple robotic devices 590 in parallel. The community charging station may be configured to charge multiple robotic devices 590 in serial such that the multiple robotic devices 590 take turns charging and, when fully charged, return to a predefined home base or reference location in the home that is not associated with a charger. The number of community charging stations may be less than the number of robotic devices 590.

In addition, the charging stations may not be assigned to specific robotic devices 590 and may be capable of charging any of the robotic devices 590. In this regard, the robotic devices 590 may use any suitable, unoccupied charging station when not in use. For instance, when one of the robotic devices 590 has completed an operation or is in need of battery charge, the control unit 510 references a stored table of the occupancy status of each charging station and instructs the robotic device to navigate to the nearest charging station that is unoccupied.

The system 500 further includes one or more integrated security devices 580. The one or more integrated security devices may include any type of device used to provide alerts based on received sensor data. For instance, the one or more control units 510 may provide one or more alerts to the one or more integrated security input/output devices 580. Additionally, the one or more control units 510 may receive one or more sensor data from the sensors 520 and determine whether to provide an alert to the one or more integrated security input/output devices 580.

The sensors 520, the home automation controls 522, the camera 530, the thermostat 534, and the integrated security devices 580 may communicate with the controller 512 over communication links 524, 526, 528, 532, 538, and 584. The communication links 524, 526, 528, 532, 538, and 584 may be a wired or wireless data pathway configured to transmit signals from the sensors 520, the home automation controls 522, the camera 530, the thermostat 534, and the integrated security devices 580 to the controller 512. The sensors 520, the home automation controls 522, the camera 530, the thermostat 534, and the integrated security devices 580 may continuously transmit sensed values to the controller 512, periodically transmit sensed values to the controller 512, or transmit sensed values to the controller 512 in response to a change in a sensed value.

The communication links 524, 526, 528, 532, 538, and 584 may include a local network. The sensors 520, the home automation controls 522, the camera 530, the thermostat 534, and the integrated security devices 580, and the controller 512 may exchange data and commands over the local network. The local network may include 802.11 “Wi-Fi” wireless Ethernet (e.g., using low-power Wi-Fi chipsets), Z-Wave, Zigbee, Bluetooth, “Homeplug” or other “Powerline” networks that operate over AC wiring, and a Category 5 (CATS) or Category 6 (CAT6) wired Ethernet network. The local network may be a mesh network constructed based on the devices connected to the mesh network.

The monitoring server 560 is an electronic device configured to provide monitoring services by exchanging electronic communications with the control unit 510, the one or more user devices 540 and 550, and the central alarm station server 570 over the network 505. For example, the monitoring server 560 may be configured to monitor events generated by the control unit 510. In this example, the monitoring server 560 may exchange electronic communications with the network module 514 included in the control unit 510 to receive information regarding events detected by the control unit 510. The monitoring server 560 also may receive information regarding events from the one or more user devices 540 and 550.

In some examples, the monitoring server 560 may route alert data received from the network module 514 or the one or more user devices 540 and 550 to the central alarm station server 570. For example, the monitoring server 560 may transmit the alert data to the central alarm station server 570 over the network 505.

The monitoring server 560 may store sensor and image data received from the monitoring system and perform analysis of sensor and image data received from the monitoring system. Based on the analysis, the monitoring server 560 may communicate with and control aspects of the control unit 510 or the one or more user devices 540 and 550.

The monitoring server 560 may provide various monitoring services to the system 500. For example, the monitoring server 560 may analyze the sensor, image, and other data to determine an activity pattern of a resident of the home monitored by the system 500. In some implementations, the monitoring server 560 analyzes the data for alarm conditions or may determine and perform actions at the home by issuing commands to one or more of the controls 522, possibly through the control unit 510.

The monitoring server 560 can be configured to provide information (e.g., activity patterns) related to one or more residents of the home monitored by the system 500 (e.g., the occupant 102). For example, one or more of the sensors 520, the home automation controls 522, the camera 530, the thermostat 534, and the integrated security devices 580 can collect data related to a resident including location information (e.g., if the resident is home or is not home) and provide location information to the thermostat 534.

The central alarm station server 570 is an electronic device configured to provide alarm monitoring service by exchanging communications with the control unit 510, the one or more user devices 540 and 550, and the monitoring server 560 over the network 505. For example, the central alarm station server 570 may be configured to monitor alerting events generated by the control unit 510. In this example, the central alarm station server 570 may exchange communications with the network module 514 included in the control unit 510 to receive information regarding alerting events detected by the control unit 510. The central alarm station server 570 also may receive information regarding alerting events from the one or more user devices 540 and 550 and/or the monitoring server 560.

The central alarm station server 570 is connected to multiple terminals 572 and 574. The terminals 572 and 574 may be used by operators to process alerting events. For example, the central alarm station server 570 may route alerting data to the terminals 572 and 574 to enable an operator to process the alerting data. The terminals 572 and 574 may include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a sensor 520 detected motion from a motion sensor via the sensors 520. The central alarm station server 570 may receive the alerting data and route the alerting data to the terminal 572 for processing by an operator associated with the terminal 572. The terminal 572 may render a display to the operator that includes information associated with the alerting event (e.g., the lock sensor data, the motion sensor data, the contact sensor data, etc.) and the operator may handle the alerting event based on the displayed information.

In some implementations, the terminals 572 and 574 are mobile devices or devices designed for a specific function. Although FIG. 5 illustrates two terminals for brevity, actual implementations may include more (and, perhaps, many more) terminals.

The one or more authorized user devices 540 and 550 are devices that host and display user interfaces. For instance, the user device 540 is a mobile device that hosts or runs one or more native applications (e.g., the home monitoring application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a home monitoring application 552. The home monitoring application 542 refers to a software/firmware program running on the corresponding mobile device that enables the user interface and features described throughout. The user device 540 may load or install the home monitoring application 542 based on data received over a network or data received from local media. The home monitoring application 542 runs on mobile devices platforms, such as iPhone, iPod touch, Blackberry, Google Android, Windows Mobile, etc. The home monitoring application 542 enables the user device 540 to receive and process image and sensor data from the monitoring system.

The user device 540 may be a general-purpose computer (e.g., a desktop personal computer, a workstation, or a laptop computer) that is configured to communicate with the monitoring server 560 and/or the control unit 510 over the network 505. The user device 540 may be configured to display a smart home user interface 552 that is generated by the user device 540 or generated by the monitoring server 560. For example, the user device 540 may be configured to display a user interface (e.g., a web page) provided by the monitoring server 560 that enables a user to perceive images captured by the camera 530 and/or reports related to the monitoring system. Although FIG. 5 illustrates two user devices for brevity, actual implementations may include more (and, perhaps, many more) or fewer user devices.

In some implementations, the one or more user devices 540 and 550 communicate with and receive monitoring system data from the control unit 510 using the communication link 538. For instance, the one or more user devices 540 and 550 may communicate with the control unit 510 using various local wireless protocols such as Wi-Fi, Bluetooth, Z-wave, Zigbee, HomePlug (ethernet over power line), other Powerline networks that operate over AC wiring, or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring server 560) may be significantly slower.

Although the one or more user devices 540 and 550 are shown as communicating with the control unit 510, the one or more user devices 540 and 550 may communicate directly with the sensors and other devices controlled by the control unit 510. In some implementations, the one or more user devices 540 and 550 replace the control unit 510 and perform the functions of the control unit 510 for local monitoring and long range/offsite communication.

In other implementations, the one or more user devices 540 and 550 receive monitoring system data captured by the control unit 510 through the network 505. The one or more user devices 540, 550 may receive the data from the control unit 510 through the network 505 or the monitoring server 560 may relay data received from the control unit 510 to the one or more user devices 540 and 550 through the network 505. In this regard, the monitoring server 560 may facilitate communication between the one or more user devices 540 and 550 and the monitoring system.

In some implementations, the one or more user devices 540 and 550 are configured to switch whether the one or more user devices 540 and 550 communicate with the control unit 510 directly (e.g., through link 538) or through the monitoring server 560 (e.g., through network 505) based on a location of the one or more user devices 540 and 550. For instance, when the one or more user devices 540 and 550 are located close to the control unit 510 and in range to communicate directly with the control unit 510, the one or more user devices 540 and 550 use direct communication. When the one or more user devices 540 and 550 are located far from the control unit 510 and not in range to communicate directly with the control unit 510, the one or more user devices 540 and 550 use communication through the monitoring server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 includes the one or more user devices 540 and 550, the sensors 520, the home automation controls 522, the camera 530, and the robotic devices 590. The one or more user devices 540 and 550 receive data directly from the sensors 520, the home automation controls 522, the camera 530, and the robotic devices 590, and sends data directly to the sensors 520, the home automation controls 522, the camera 530, and the robotic devices 590. The one or more user devices 540, 550 provide the appropriate interfaces/processing to provide visual surveillance and reporting.

In other implementations, the system 500 further includes network 505 and the sensors 520, the home automation controls 522, the camera 530, the thermostat 534, and the robotic devices 590, and are configured to communicate sensor and image data to the one or more user devices 540 and 550 over network 505 (e.g., the Internet, cellular network, etc.). In yet another implementation, the sensors 520, the home automation controls 522, the camera 530, the thermostat 534, and the robotic devices 590 (or a component, such as a bridge/router) are intelligent enough to change the communication pathway from a direct local pathway when the one or more user devices 540 and 550 are in close physical proximity to the sensors 520, the home automation controls 522, the camera 530, the thermostat 534, and the robotic devices 590 to a pathway over network 505 when the one or more user devices 540 and 550 are farther from the sensors 520, the home automation controls 522, the camera 530, the thermostat 534, and the robotic devices 590.

In some examples, the system leverages GPS information from the one or more user devices 540 and 550 to determine whether the one or more user devices 540 and 550 are close enough to the sensors 520, the home automation controls 522, the camera 530, the thermostat 534, and the robotic devices 590 to use the direct local pathway or whether the one or more user devices 540 and 550 are far enough from the sensors 520, the home automation controls 522, the camera 530, the thermostat 534, and the robotic devices 590 that the pathway over network 505 is required.

In other examples, the system leverages status communications (e.g., pinging) between the one or more user devices 540 and 550 and the sensors 520, the home automation controls 522, the camera 530, the thermostat 534, and the robotic devices 590 to determine whether communication using the direct local pathway is possible. If communication using the direct local pathway is possible, the one or more user devices 540 and 550 communicate with the sensors 520, the home automation controls 522, the camera 530, the thermostat 534, and the robotic devices 590 using the direct local pathway. If communication using the direct local pathway is not possible, the one or more user devices 540 and 550 communicate with the sensors 520, the home automation controls 522, the camera 530, the thermostat 534, and the robotic devices 590 using the pathway over network 505.

In some implementations, the system 500 provides end users with access to images captured by the camera 530 to aid in decision making. The system 500 may transmit the images captured by the camera 530 over a wireless WAN network to the user devices 540 and 550. Because transmission over a wireless WAN network may be relatively expensive, the system 500 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 530). In these implementations, the camera 530 may be set to capture images on a periodic basis when the alarm system is armed in an "away" state, but set not to capture images when the alarm system is armed in a "home" state or disarmed. In addition, the camera 530 may be triggered to begin capturing images when the alarm system detects an event, such as an alarm event, a door-opening event for a door that leads to an area within a field of view of the camera 530, or motion in the area within the field of view of the camera 530. In other implementations, the camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method comprising:

maintaining, by a property monitoring system that monitors activity at a property, data indicating a) first alert data for the property when a state of the property corresponds to a first state, b) second alert data for the property when the state of the property corresponds to a second state different than the first state, and c) one or more devices to alert for one or more states of the property;

detecting, using sensor data from one or more connected devices of the property monitoring system, that the state of the property corresponds to the first state;

determining, using data for an occupant at the property and by the property monitoring system, whether the data indicates that an earbud is being used by the occupant at the property;

in response to determining that the data indicates that the earbud is being used by the occupant at the property and detecting that the state of the property corresponds to the first state, generating, using the first alert data for the property when the state of the property corresponds to the first state and by the property monitoring system, an earbud alert for the earbud comprising information about an event detected at the property and that is a different alert than if the property were in the second state different than the first state; and transmitting, using the property monitoring system, the earbud alert for receipt by the earbud being used by the occupant.

2. The method of claim 1, comprising:

receiving the sensor data from the one or more connected devices of the property monitoring system; and wherein detecting that the state of the property corresponds to the first state comprises detecting the state of the property using the received sensor data.

3. The method of claim 1, comprising:

receiving audio captured at the property; and wherein transmitting the earbud alert comprises transmitting the received audio captured at the property.

4. The method of claim 1, wherein transmitting the earbud alert comprises:

transmitting data configured to generate an alert message to the earbud being used by the occupant at the property.

5. The method of claim 1, wherein transmitting the earbud alert comprises:

transmitting data configured to generate an alert message to a smartphone connected to the earbud being used by the occupant at the property.

6. The method of claim 1, wherein:

maintaining the data by the property monitoring system that monitors activity at the property comprises maintaining data that indicates one or more devices to alert in response to one or more conditions, and wherein at least one of the one or more conditions indicate a range of time; and generating the earbud alert using the first alert data for the property when the state of the property corresponds to the first state comprises generating the earbud alert using the data indicating the one or more devices to alert in response to the one or more conditions.

7. The method of claim 6, comprising:

determining, using the maintained data, that a current time is included in the range of time; and identifying, using the maintained data, a type of alert corresponding to the range of time, wherein generating the earbud alert using the data indicating the one or more devices to alert in response to the one or more conditions comprises generating the earbud alert as the type of alert identified in the maintained data.

8. The method of claim 7, wherein the type of alert is an indicator to transmit an alert to the earbud being used by the occupant and not another device at the property.

9. The method of claim 6, wherein:

maintaining the data by the property monitoring system that monitors activity at the property comprises maintaining (i) first data indicating the earbud to alert within a first range of time and (ii) second data indicating another earbud to alert within a second range of time, and the method comprises:

determining whether a current time satisfies the first range of time; and in response to determining that the current time satisfies the first range of time, selecting, using the maintained data, the earbud from the one or more devices to alert in response to the one or more conditions, wherein generating the earbud alert for the earbud comprises:

generating the earbud alert for the selected earbud from the one or more devices to alert.

10. The method of claim 1, comprising:

receiving information indicating a state of the earbud as the data for the occupant at the property, wherein determining whether the data indicates that the earbud is being used by the occupant comprises:

determining, using the information indicating the state of the earbud, whether the data indicates that the earbud is being used.

11. The method of claim 1, comprising:

receiving information indicating a state of the earbud as the data for the occupant at the property, wherein the information indicating the state of the earbud comprises at least one of:

data provided by a mobile device of the occupant or charging case of the earbud, or data indicating that the earbud has been removed from the charging case, and wherein determining whether the data indicates that the earbud is being used by the occupant comprises determining using at least one of:

the data provided by the mobile device of the occupant or the charging case of the earbud, or the data indicating that the earbud has been removed from the charging case.

12. The method of claim 1, wherein determining whether the data indicates that the earbud is being used by the occupant at the property comprises:

determining whether the data indicates that the earbud is being worn by the occupant at the property.

13. One or more non-transitory computer storage media encoded with instructions that, when executed by one or more computers, cause the one or more computers to perform operations comprising:

maintaining, by a property monitoring system that monitors activity at a property, data indicating a) first alert data for the property when a state of the property corresponds to a first state, b) second alert data for the property when the state of the property corresponds to a second state different than the first state, and c) one or more devices to alert for one or more states of the property;

detecting, using sensor data from one or more connected devices of the property monitoring system, that the state of the property corresponds to the first state;

determining, using data for an occupant at the property and by the property monitoring system, whether the data indicates that an earbud is being used by the occupant at the property;

in response to determining that the data indicates that the earbud is being used by the occupant at the property and detecting that the state of the property corresponds to the first state, generating, using the first alert data for the property when the state of the property corresponds to the first state and by the property monitoring system, an earbud alert for the earbud comprising information about an event detected at the property and that is a different alert than if the property were in the second state different than the first state; and transmitting, using the property monitoring system, the earbud alert for receipt by the earbud being used by the occupant.

14. The media of claim 13, wherein the operations comprise:

receiving the sensor data from the one or more connected devices of the property monitoring system; and wherein detecting that the state of the property corresponds to the first state comprises detecting the state of the property using the received sensor data.

15. The media of claim 13, wherein transmitting the earbud alert comprises:

transmitting data configured to generate an alert message to a smartphone connected to the earbud being used by the occupant at the property.

16. The media of claim 13, wherein;

maintaining the data by the property monitoring system that monitors activity at the property comprises maintaining data that indicates one or more devices to alert in response to one or more conditions, and wherein at least one of the one or more conditions indicate a range of time; and generating the earbud alert using the first alert data for the property when the state of the property corresponds to the first state comprises generating the earbud alert using the data indicating the one or more devices to alert in response to the one or more conditions.

17. The media of claim 16, wherein the operations comprise:

determining, using the maintained data, that a current time is included in the range of time; and identifying, using the maintained data, a type of alert corresponding to the range of time, wherein generating the earbud alert using the data indicating the one or more devices to alert in response to the one or more conditions comprises generating the earbud alert as the type of alert identified in the maintained data.

18. The media of claim 13, wherein:

maintaining the data by the property monitoring system that monitors activity at the property comprises maintaining data that indicates one or more devices to alert in response to one or more conditions, and wherein at least one of the one or more conditions indicate a range of time; and generating the earbud alert using the first alert data for the property when the state of the property corresponds to the first state comprises generating the earbud alert using the data indicating the one or more devices to alert in response to the one or more conditions.

19. A system comprising one or more computers and one or more storage devices on which are stored instructions that are operable, when executed by the one or more computers, to cause the one or more computers to perform operations comprising:

maintaining, by a property monitoring system that monitors activity at a property, data indicating a) first alert data for the property when a state of the property corresponds to a first state, b) second alert data for the property when the state of the property corresponds to a second state different than the first state, and c) one or more devices to alert for one or more states of the property;

detecting, using sensor data from one or more connected devices of the property monitoring system, that the state of the property corresponds to the first state;

determining, using data for an occupant at the property and by the property monitoring system, whether the data indicates that an earbud is being used by the occupant at the property;

in response to determining that the data indicates that the earbud is being used by the occupant at the property and detecting that the state of the property corresponds to the first state, generating, using the first alert data for the property when the state of the property corresponds to the first state and by the property monitoring system, an earbud alert for the earbud comprising information about an event detected at the property and that is a different alert than if the property were in the second state different than the first state; and transmitting, using the property monitoring system, the earbud alert for receipt by the earbud being used by the occupant.

20. The system of claim 19, wherein:

maintaining the data by the property monitoring system that monitors activity at the property comprises maintaining data that indicates one or more devices to alert in response to one or more conditions, and wherein at least one of the one or more conditions indicate a range of time; and generating the earbud alert using the first alert data for the property when the state of the property corresponds to the first state comprises generating the earbud alert using the data indicating the one or more devices to alert in response to the one or more conditions.

* * * * *